(12) United States Patent
Nomaru (10) Patent No.: US 11,969,916 B2
(45) Date of Patent: Apr. 30, 2024

(54) WAFER FORMING METHOD

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 460 days.

(21) Appl. No.: 17/219,984

(22) Filed: Apr. 1, 2021

(65) Prior Publication Data

US 2021/0316476 A1    Oct. 14, 2021

(30) Foreign Application Priority Data

Apr. 10, 2020   (JP) ................... 2020-071076

(51) Int. Cl.
  *B28D 5/00*    (2006.01)
  *B23K 26/53*   (2014.01)
  *B23K 103/00*  (2006.01)

(52) U.S. Cl.
  CPC ............ *B28D 5/0011* (2013.01); *B23K 26/53* (2015.10); *B23K 2103/56* (2018.08); *B28D 5/0052* (2013.01)

(58) Field of Classification Search
  CPC ............... B23K 26/53; B23K 26/0322; B23K 26/0823; B23K 26/0853; B23K 26/0869; B23K 2101/40; B23K 2103/56; B28D 5/0011; B28D 5/0052
  USPC ........................................................... 225/2
  See application file for complete search history.

(56) References Cited

U.S. PATENT DOCUMENTS

| | | | |
|---|---|---|---|
| 11,869,810 B2 * | 1/2024 | Swoboda | B28D 5/0011 |
| 2012/0156816 A1 * | 6/2012 | Okamura | B28D 5/0011 438/33 |
| 2015/0158117 A1 * | 6/2015 | Munoz | B26F 3/004 216/87 |
| 2015/0158255 A1 * | 6/2015 | Munoz | B29C 69/001 264/400 |
| 2016/0074960 A1 * | 3/2016 | Hirata | B23K 26/702 225/2 |

(Continued)

FOREIGN PATENT DOCUMENTS

| | | |
|---|---|---|
| JP | 2000094221 A | 4/2000 |
| JP | 2012109341 A | 6/2012 |

(Continued)

OTHER PUBLICATIONS

Office Action tissued in corresponding Japanese patent application No. 2020-071076, dated Dec. 6, 2023.

*Primary Examiner* — Nhat Chieu Q Do
(74) *Attorney, Agent, or Firm* — Greer Burns & Crain Ltd.

(57) ABSTRACT

A wafer forming method includes a modified layer forming step of applying a laser beam of such a wavelength as to be transmitted through an ingot to the ingot with a focal point of the laser beam positioned inside from a side surface at a position corresponding to the thickness of a wafer to be formed, to form a modified layer over the whole circumference of the side surface, a peeling-off layer forming step of exerting an external force from an upper surface of the ingot and concentrating a stress on a crack extending from the modified layer to the inside, to cause the crack to develop from the side surface side toward the inside and form a peeling-off layer, and a wafer forming step of peeling off a wafer to be formed, from the ingot, with the peeling-off layer as a start point, to form the wafer.

8 Claims, 6 Drawing Sheets

(56) References Cited

U.S. PATENT DOCUMENTS

| | | | | |
|---|---|---|---|---|
| 2017/0291254 A1* | 10/2017 | Hirata | ............... | B28D 5/0011 |
| 2017/0341179 A1* | 11/2017 | Hirata | ................. | B23K 26/10 |
| 2018/0308679 A1* | 10/2018 | Hirata | .................. | C30B 29/36 |
| 2019/0061060 A1* | 2/2019 | Kamiyama | ............ | C30B 33/06 |

FOREIGN PATENT DOCUMENTS

| | | |
|---|---|---|
| JP | 2013049161 A | 3/2013 |
| WO | 2018192691 A1 | 10/2018 |

\* cited by examiner

WAFER FORMING METHOD

BACKGROUND OF THE INVENTION

Field of the Invention

The present invention relates to a wafer forming method for forming a wafer from a semiconductor ingot.

Description of the Related Art

Devices such as integrated circuits (ICs), large-scale integrated circuits (LSIs), and light emitting diodes (LEDs) are formed by being partitioned by a plurality of intersecting streets in a functional layer stacked on a front surface of a wafer formed from silicon, sapphire, or the like as a blank material. Then, processing is applied to the streets of the wafer by a cutting apparatus or a laser processing apparatus, to divide the wafer into individual device chips, which are used for electric apparatuses such as mobile phones and personal computers.

Further, power devices, LEDs, and the like are formed by being partitioned by a plurality of intersecting streets in a functional layer stacked on a front surface of a wafer formed from hexagonal single crystal of silicon carbide (SiC) or gallium nitride (GaN) as a blank material.

The wafer to be formed with the devices is normally formed by slicing a semiconductor ingot by a wire saw, and the front and back surfaces of the sliced wafer are finished to mirror surfaces (see, for example, Japanese Patent Laid-open No. 2000-094221).

However, when the semiconductor ingot is cut by a wire saw and the front and back surfaces are polished to form the wafer, 70% to 80% of the semiconductor ingot is thrown away, which is uneconomical. Particularly, a hexagonal single crystal ingot of SiC, GaN, or the like is high in hardness, making it difficult to cut such an ingot by the wire saw; therefore, it takes considerable time to slice the ingot, lowering productivity and increasing the unit price of the ingot, and further making it difficult to form wafers efficiently.

In view of this, for reducing the proportion of the ingot thrown away, proposed is a technology in which a laser beam of such a wavelength as to be transmitted through a semiconductor ingot is applied to the ingot with a focal point of the laser beam positioned inside from the upper surface of the ingot, and a modified layer is formed at a planned cutting surface, to separate the wafer with the modified layer as a peeling-off surface (see, for example, Japanese Patent Laid-open No. 2013-049161).

SUMMARY OF THE INVENTION

However, according to the technology described in Japanese Patent Laid-open No. 2013-049161, the laser beam for forming the modified layer must be applied densely at an interval on the order of 10 μm to the whole region of the planned cutting surface, which takes time and is poor in productivity.

Accordingly, it is an object of the present invention to provide a wafer forming method by which wafers can be efficiently formed from a semiconductor ingot and the amount of the semiconductor ingot to be thrown away can be reduced.

In accordance with an aspect of the present invention, there is provided a wafer forming method for forming a wafer from a semiconductor ingot having an upper surface, a lower surface, and a side surface, the wafer forming method including a modified layer forming step of applying a laser beam of such a wavelength as to be transmitted through the semiconductor ingot to the semiconductor ingot, with a focal point of the laser beam positioned inside from the side surface at a position corresponding to the thickness of a wafer to be formed, to form a modified layer over the whole circumference of the side surface or in an arcuate shape, a peeling-off layer forming step of exerting an external force from the upper surface of the semiconductor ingot and concentrating a stress on a crack extending from the modified layer to the inside to cause the crack to develop from the side surface side toward the inside, thereby forming a peeling-off layer, and a wafer forming step of peeling off the wafer to be formed, from the semiconductor ingot, with the peeling-off layer as a start point, to form the wafer.

Preferably, in the peeling-off layer forming step, the external force exerted from the upper surface of the semiconductor ingot is a laser beam, and the laser beam is applied spirally from an outer circumference toward the inside or is applied rectilinearly while indexing feeding is performed.

Preferably, in the case of applying the laser beam as means for exerting an external force in the peeling-off layer forming step, a laser beam of such a wavelength as to be absorbed in the semiconductor ingot is applied while being positioned inside the wafer to be formed, to thereby partially expand the wafer to be formed and cause the crack to develop from the side surface to the inside. Preferably, in the case of applying the laser beam as the means for exerting an external force in the peeling-off layer forming step, a pulsed laser beam of such a wavelength as to be absorbed in the semiconductor ingot is applied to the upper surface of the semiconductor ingot to generate a stress wave by heating, and the crack is caused to develop from the side surface toward the inside by a stress generated when the stress wave reaching the inside reaches the crack and is reflected by the crack. Alternatively, a pulsed laser beam of such a wavelength as to be transmitted through the semiconductor ingot is applied with a focal point of the pulsed laser beam positioned at the crack, to cause the crack to develop from the side surface to the inside by a stress caused by nonlinear absorption.

Preferably, between the modified layer forming step and the peeling-off layer forming step, a cutting blade is positioned from the side surface of the semiconductor ingot to engrave the modified layer and thereby form a cut groove, and a crack extending from the modified layer to the inside is formed. Preferably, in the peeling-off layer forming step, the external force exerted from the upper surface of the semiconductor ingot is an ultrasonic wave, a wedge is positioned at a cut groove formed by positioning a cutting blade from the side surface of the semiconductor ingot to engrave the modified layer, and the ultrasonic wave is applied from the upper surface of the semiconductor ingot to cause the crack to develop from the side surface of the semiconductor ingot to the inside.

Preferably, in the modified layer forming step, a plurality of modified layers may be formed according to the number of a plurality of wafers to be formed. In the modified layer forming step, in the case of forming a plurality of modified layers corresponding to the number of the plurality of wafers to be formed, a peeling-off layer forming step of forming a peeling-off layer extending from the modified layer corresponding to the wafer to be formed next to the inside is performed after the wafer to be formed is peeled off from the upper surface of the semiconductor ingot in the wafer forming step.

According to the wafer forming method of the present invention, the crack formed to extend to the inside from the modified layer formed from the side surface side of the semiconductor ingot can be caused to efficiently develop to the inside and the modified layer can thereby be formed; therefore, the amount of the semiconductor ingot thrown away at the time of forming wafers from the semiconductor ingot can be reduced, and the wafers can be efficiently formed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
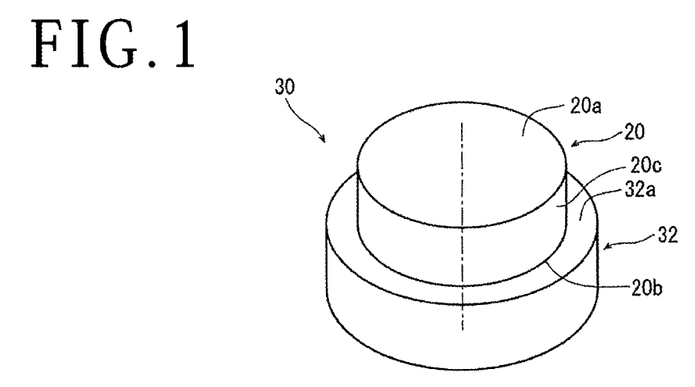
FIG. 1 is a perspective view of a semiconductor ingot placed and held on a holding table of a processing apparatus.

A wafer forming method according to embodiments of the present invention will be described in detail below referring to the attached drawings. FIG. 1 illustrates a semiconductor ingot (hereinafter simply referred to as an ingot) 20 to be processed in the present embodiment. The ingot 20 is, for example, a silicon (Si) ingot, and is a cylindrical member having an upper surface 20a having undergone polishing, a lower surface 20b, and a side surface 20c. The ingot 20 has a diameter of 200 mm and a height (thickness) of 100 mm. The ingot 20 is carried to a processing apparatus 30 (only a part of which is illustrated), is placed on a holding surface 32a which is an upper surface of a holding table 32 and is formed to be flat, and is fixed in situ by a wax, an adhesive, or the like.

Figure 2:
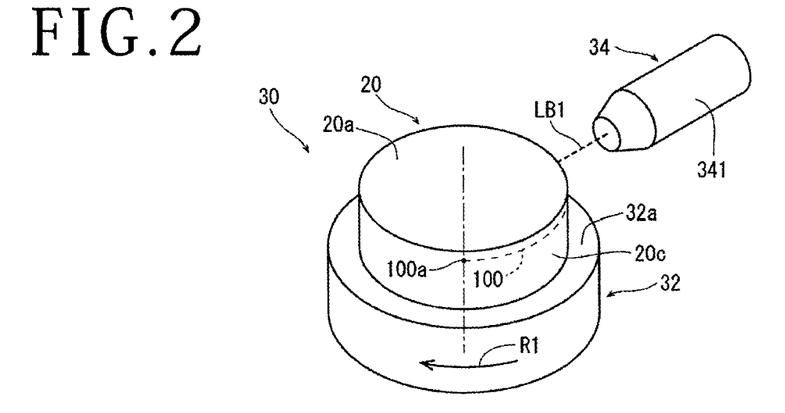
FIG. 2 is a perspective view depicting an embodiment of a modified layer forming step.

In carrying out the wafer forming method according to the present embodiment, first, as depicted in FIG. 2, a beam condenser 341 of a laser beam applying unit 34 is positioned at a position facing the side surface 20c of the ingot 20 fixed to the holding table 32. The laser beam applying unit 34 is means for applying a pulsed laser beam LB1 of such a wavelength as to be transmitted through the ingot 20. Though illustration is omitted, the laser beam applying unit 34 includes an optical system including a laser oscillator that emits a predetermined pulsed laser beam LB1, and, in the present embodiment, is set to apply the laser beam LB1 in the following laser processing conditions.

Wavelength: 1,064 nm
Repetition frequency: 80 kHz
Average output: 3.2 W
Pulse width: 4 ns
Spot diameter: 5 μm
Numerical aperture (NA): 0.45

The focal point of the laser beam LB1 applied from the beam condenser 341 of the laser beam applying unit 34 is set at a depth (for example, 1 mm) corresponding to the thickness of the wafer to be formed and at a position 100 μm on the inner side from the side surface 20c, as viewed from the upper surface 20a of the ingot 20. After the position of the focal point is set, the laser beam applying unit 34 is operated under the above-mentioned laser processing conditions, to apply the laser beam LB1 from a processing start position (indicated by 100a in the figure), and rotational driving means (omitted from illustration) for the holding table 32 is operated to rotate the holding table 32 in the direction indicated by an arrow R1, to form a modified layer 100 over the whole circumference of the side surface 20c of the ingot 20 (modified layer forming step). Note that the feeding speed at the time of forming the modified layer 100 is, for example, 400 mm/sec.

Figure 3:
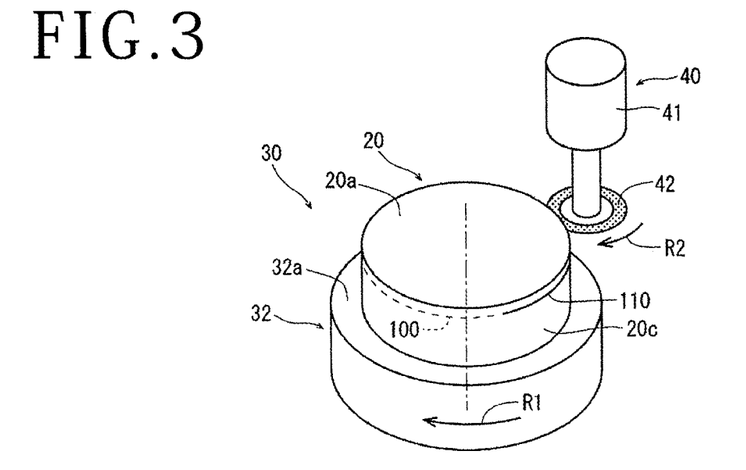
FIG. 3 is a perspective view depicting the manner in which a cutting blade is positioned from a side surface of the semiconductor ingot to engrave a modified layer.

After the modified layer forming step is performed, in the present embodiment, before the peeling-off layer forming step as a next step is conducted, carried out is a crack growth step or a cut groove forming step in which, as depicted in FIG. 3, the modified layer 100 is engraved by use of a cutting unit 40 from the side surface 20c of the ingot 20, to cause a crack extending from the modified layer 100 to the inside to grow. The procedure of the same will be described more specifically referring to FIG. 3.

As illustrated in FIG. 3, the cutting unit 40 includes an electric motor 41, a cutting blade 42 rotated in the direction indicated by an arrow R2 by the electric motor 41, and driving means (omitted from illustration) that performs cutting-in feeding, in a horizontal direction, of the cutting blade 42 toward the side surface 20c of the ingot 20. The cutting blade 42 is positioned at a position to face the side surface 20c of the ingot 20 and at a depth position where the modified layer 100 is formed, the electric motor 41 is operated to perform cutting-in feeding in the direction of the inside of the ingot 20 from the side surface 20c, and, at the same time, the holding table 32 is rotated in the direction indicated by the arrow R1. The cutting-in feeding amount is approximately 1 mm from the side surface 20c toward the inside. By engraving the modified layer 100 in this way, a cut groove 110 is formed at the position where the modified layer 100 is formed, and, further, the crack formed together with the modified layer 100 can be made to grow in the direction toward the inside. Note that, in the case where a sufficient crack is formed by formation of the modified layer 100, the crack growth step may be omitted.

After the modified layer forming step and the optionally conducted crack growth step are performed, carried out is a peeling-off layer forming step in which an external force is exerted from the upper surface 20a of the ingot 20 and a stress is concentrated on the crack formed inside the ingot 20 to cause the crack to develop in the direction toward the inside from the side surface 20c side, thereby forming a peeling-off layer.

The method for carrying out the exertion of an external force in the peeling-off layer forming step of the present embodiment can be selected from various methods; for example, a method of applying a laser beam from the upper surface 20a of the ingot 20 can be selected. Further, the method of applying the laser beam from the upper surface 20a of the ingot 20 can also be selected from a plurality of methods.

First external force exerting means for exerting an external force in the peeling-off layer forming step may be selected, for example, as means of applying a laser beam of such a wavelength as to be absorbed in the ingot 20 with the focal point of the laser beam positioned at a position inside the wafer to be formed, to thereby partially expand the inside of the wafer to be formed and form an expanded region. This will be described more specifically, referring to FIGS. 4A to 4C.

Figure 4A:
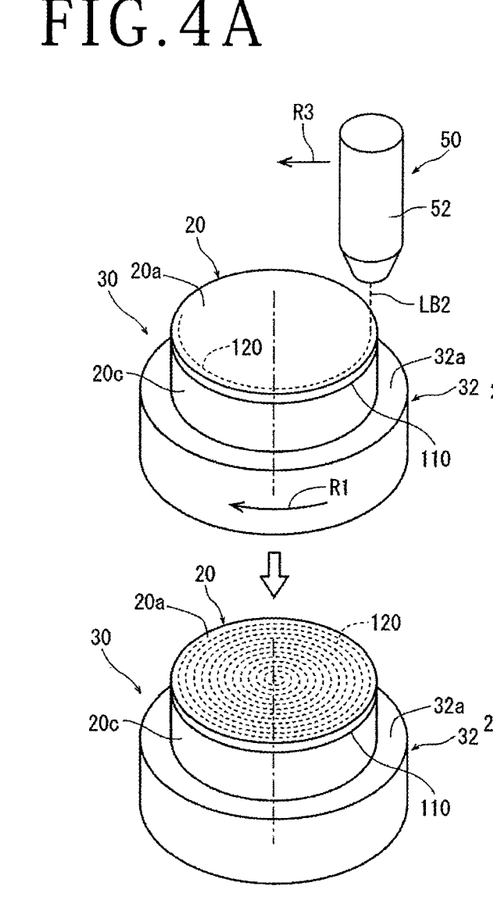
FIG. 4A is a perspective view depicting the manner in which a laser beam is applied spirally to form a modified layer.
Figure 4B:
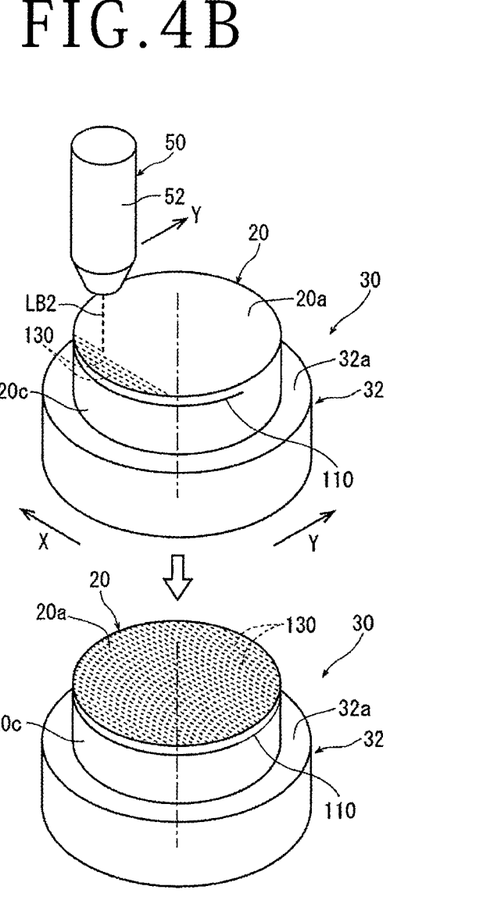
FIG. 4B is a perspective view depicting the manner in which a laser beam is applied rectilinearly while indexing feeding is performed, to form a modified layer.

FIGS. 4A and 4B depict a beam condenser 52 of a laser beam applying unit 50 (only a part of which is illustrated) to be used as the first external force exerting means. The laser processing conditions of the laser beam LB2 applied from the laser beam applying unit 50 are, for example, as follows. Note that the laser beam LB2 may be either of a pulsed laser beam and a continuous wave laser beam.

Figure 4C:
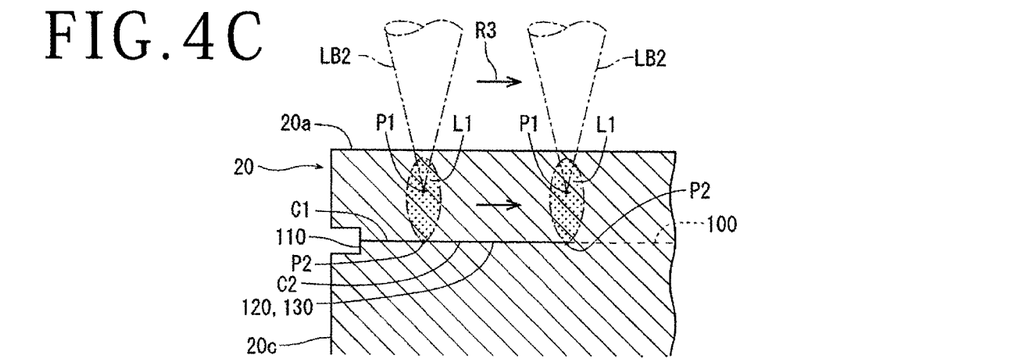
FIG. 4C is a partial enlarged sectional view depicting a mode of forming an expanded region in the inside of the semiconductor ingot by applying a laser beam.

Wavelength: 900 to 1,100 nm
    Repetition frequency: 80 kHz (case of pulsed laser beam)
    Average output: 0.5 W
    Pulse width: 100 ns (case of pulsed laser beam)
    Spot diameter: 10 μm
    Numerical aperture (NA): 0.8
    Feeding speed: 400 mm/sec
    Indexing feeding: 1 mm As depicted in FIG. 4A, the beam condenser 52 is positioned in the vicinity of the outer circumference of the upper surface 20a of the ingot 20, and, as depicted in FIG. 4C, the focal point P1 of the laser beam LB2 is positioned between the upper surface 20a and the depth position (indicated by a dotted line) where the modified layer 100 is formed, i.e., positioned in the inside of the wafer to be formed. The laser beam LB2 is set at a comparatively weak output (0.5 W) as described above, by which a modified layer is not formed at the position of the focal point P1, but the laser beam LB2 heats the vicinity of the focal point P1 to form an expanded region L1. The position of the focal point P1 is adjusted such that a lower end P2 of the expanded region L1 formed by the laser beam LB2 is in the vicinity of the inside tip of a crack C1 formed in the modified layer forming step or the crack growth step. As a result, the ingot 20 directly under the expanded region L1 is pressed from the upper side toward the lower side, and, consequently, stress is concentrated on the tip of the crack C1, and a new crack C2 is caused to develop inside. In addition, simultaneously with this, the holding table 32 is rotated in the direction indicated by the arrow R1, and the beam condenser 52 is moved in the direction indicated by an arrow R3 toward the center of the upper surface 20a of the ingot 20. As a result, the focal point P1 of the laser beam LB2 is scanned spirally from the outer circumference toward the inside, and at the same time, the position where the expanded region L1 is to be formed is also moved spirally.

The rotating speed of the holding table 32 in this instance is set such that the feeding speed of the application position of the laser beam LB2 becomes 400 mm/sec, and the moving speed at the time of moving the beam condenser 52 in the direction indicated by the arrow R3 is set such that the indexing feeding interval at the time of spirally applying the laser beam LB2 becomes 1 mm interval. As described above, by applying the laser beam LB2 from the upper surface 20a toward the inside of the ingot 20, the crack C2 develops in the whole region at the depth position where the modified layer 100 is formed, and the peeling-off layer 120 is formed along the spiral application position. Note that, while the peeling-off layer 120 is indicated by a dotted line in FIG. 4A for the sake of convenience, in practice the peeling-off layer 120 cannot be visually observed from the outside.

In the present embodiment, at the time of applying the laser beam LB2 in the peeling-off layer forming step, the layer beam LB2 has been applied such that the position of the focal point P1 describes a spiral locus in plan view, but this is not restrictive of the present invention. For example, the laser processing conditions of the laser beam applying unit 50 are set similarly to the abovementioned conditions, the beam condenser 52 of the laser beam applying unit 50 is positioned at an end portion side of the upper surface 20a of the ingot 20, and the focal point P1 is positioned at the crack C1 formed toward the inside from the modified layer 100 formed inside the ingot 20 by the modified layer forming step. Then, as depicted in FIG. 4B, the holding table 32 is moved in the X-axis direction indicated by an arrow X, and the laser beam LB2 is applied rectilinearly. Next, the beam condenser 52 is put into indexing feeding at an interval of 1 mm in the Y-axis direction indicated by an arrow Y orthogonal to the X-axis direction, and the laser beam LB2 is applied rectilinearly in a repetitive manner. As a result, similarly to the above depicted in FIG. 4C, the crack C2 is newly developed from the crack C1, and a peeling-off layer 130 is formed in the whole region at the depth position where the modified layer 100 is formed in the ingot 20.

Note that, in the above-mentioned embodiment, the modified layer 100 has been formed over the whole circumference of the side surface 20c of the ingot 20, but this is not restrictive of the present invention, and an arc may be formed in a range less than the whole circumference; for example, an arc may be formed over one-half circumference. It is to be noted, however, that in the case where the modified layer 100 is formed in an arcuate shape, even if the laser beam LB2 is applied such that the position of the focal point P1 describes a spiral locus in plan view at the time of applying the laser beam LB2 in the peeling-off layer forming step, the new crack C2 may not develop sufficiently in a region where the modified layer 100 has not been formed, so that it is difficult to form the peeling-off layer in the whole region. In that case, it is thus preferable to apply the laser beam LB2 rectilinearly from the side where the modified layer 100 is formed in the arcuate shape, as depicted in FIG. 4B, to perform indexing feeding sequentially in the Y-axis direction indicated by the arrow Y orthogonal to the X-axis direction, and to apply the laser beam LB2 rectilinearly in a repetitive manner, thereby forming a peeling-off layer. In addition, in the case of forming the modified layer 100 in an arcuate shape, it is preferable to form the modified layer 100 over a range of equal to or more than one-half circumference.

Figure 5:
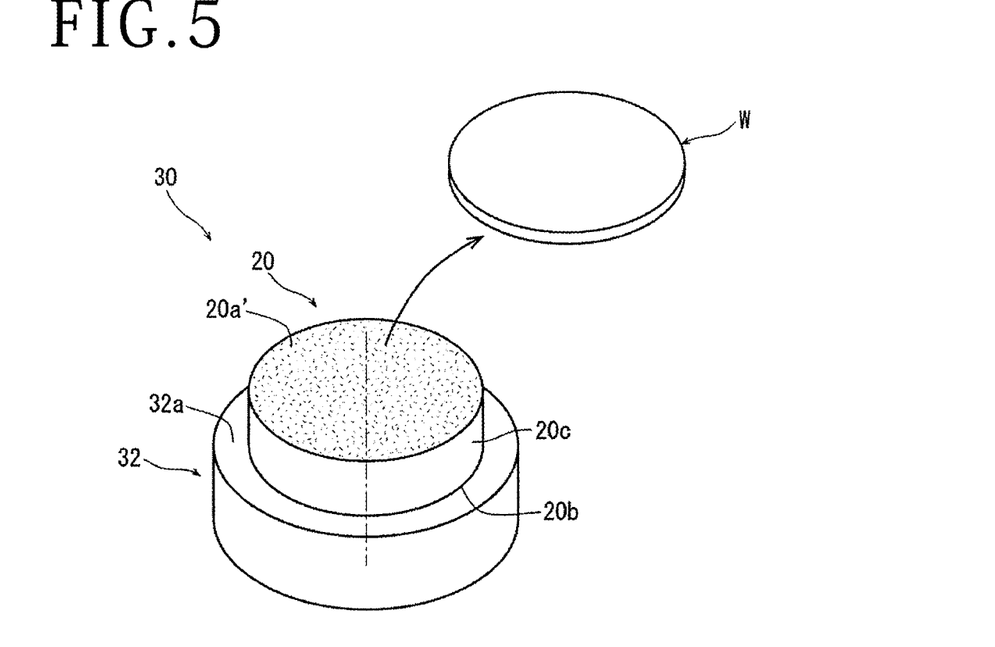
FIG. 5 is a perspective view depicting an embodiment of a wafer forming step.

Then, after the peeling-off layer is formed in the whole region of the depth position where the modified layer 100 is formed, i.e., the depth position corresponding to the thickness of the wafer to be formed, as described above, the upper surface 20a side of the ingot 20 is sucked by predetermined suction means (omitted from illustration) or the like to form the wafer W with the peeling-off layer 120 or 130 as a start point of division, as depicted in FIG. 5 (wafer forming step).

After the ingot 20 is subjected to the modified layer forming step, the peeling-off layer forming step, and the wafer forming step as described above, polishing of a new upper surface 20a' (peeling-off surface) of the ingot 20 to form a mirror surface is conducted as required, to obtain a flat surface, and the modified layer forming step, the crack growth step, the peeling-off layer forming step, and the wafer forming step are performed again to form the wafer. These steps are repeated, whereby the wafers W can be efficiently formed from the ingot 20.

Figure 6A:
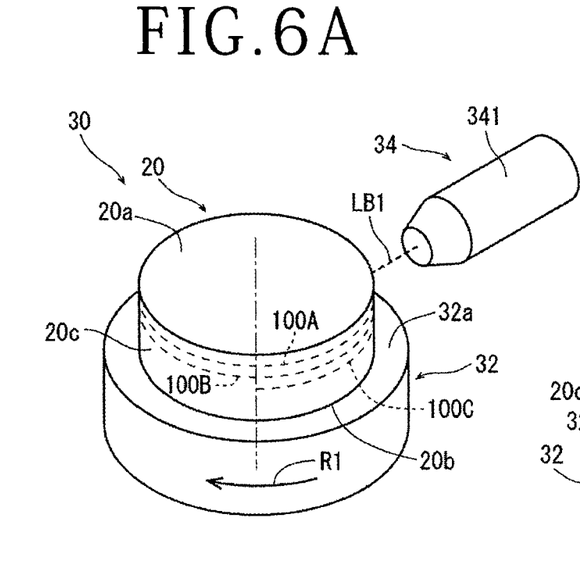
FIG. 6A is a perspective view depicting another embodiment of a modified layer forming step.
Figure 6B:
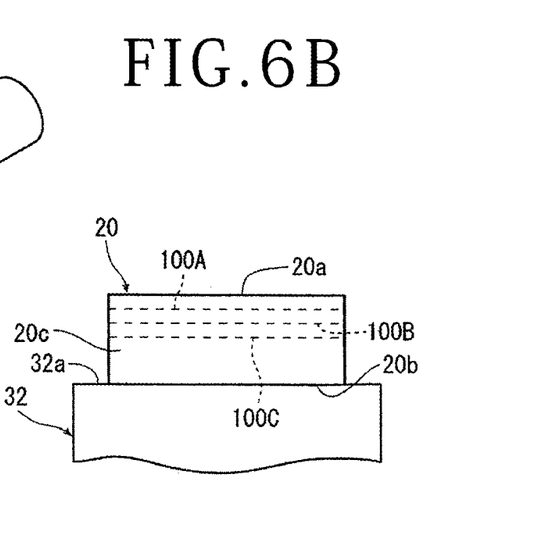
FIG. 6B is a side view of a semiconductor ingot having been subjected to the modified layer forming step depicted in FIG. 6A.

In the above-described embodiment, the modified layer forming step of forming one stage of modified layer 100 at a depth position corresponding to the thickness (1 mm) of the wafer to be formed, over the whole circumference of the side surface 20c of the ingot 20, has been conducted, and thereafter, the peeling-off layer forming step has been performed, but this is not restrictive of the present invention. For example, as depicted in FIG. 6A, the laser beam LB1 may be applied from the side surface 20c of the ingot 20 at a plurality of stages (for example, three stages) corresponding to the plurality of wafers to be formed, in the modified layer forming step, and, as depicted in FIG. 6B, modified layers 100A, 100B, and 100C may be formed collectively. With the plurality of stages of modified layers 100A, 100B, and 100C formed collectively, the peeling-off layer forming step and the wafer forming step can be performed successively, and further enhancement of efficiency can be realized.

Figure 7:
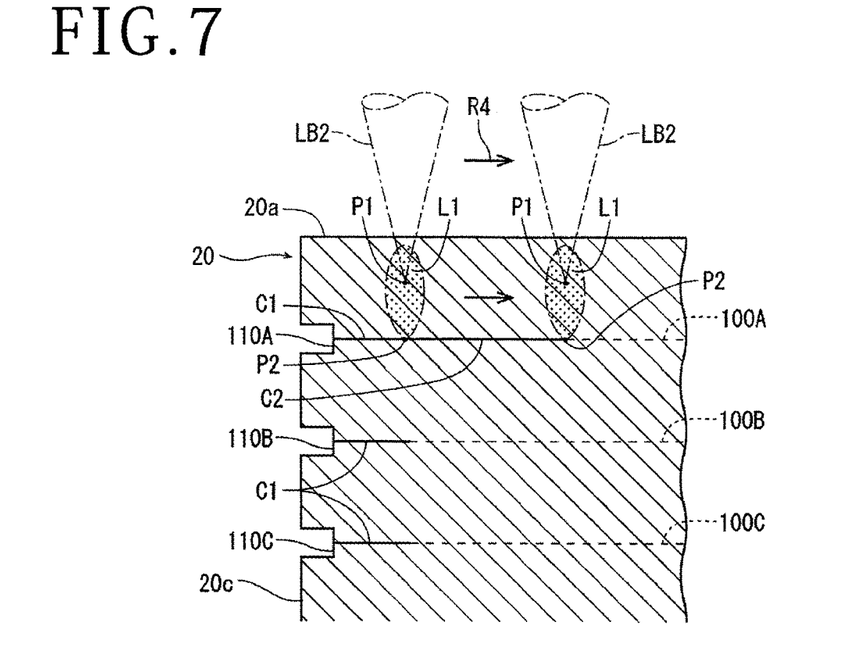
FIG. 7 is a partially enlarged sectional view depicting a mode of carrying out a peeling-off layer forming step by use of a laser beam with respect to the semiconductor ingot formed with a plurality of modified layers.

The procedure of forming the wafers by use of the first external force exerting means in the case where the plurality of stages of modified layers 100A, 100B, and 100C are collectively formed in the ingot 20 as described above will be described by referring also to FIG. 7 in addition to FIGS. 6A and 6B.

In the present embodiment, as has been described based on FIGS. 6A and 6B, in the modified layer forming step, the modified layers 100A, 100B, and 100C are collectively formed in advance, the modified layers 100A, 100B, and 100C are engraved from the side surface 20c side of the ingot 20 by use of the cutting unit 40, to form cut grooves 110A, 110B, and 110C, and the cracks C1 extending from the respective positions where the modified layers 100A, 100B, and 100C are formed to the inside are caused to develop. Note that, in FIG. 7, the depth positions where the modified layers 100A, 100B, and 100C are formed are indicated by dotted lines.

In the present embodiment, also, the laser beam LB2 is applied from the upper surface 20a and the focal point P1 is positioned in the inside of the wafer to be formed, such that the lower end P2 of the expanded region L1 becomes the tip position of the crack C1 extending from the cut groove 110A. As a result, the ingot 20 directly under the expanded region L1 is pressed from the upper side toward the lower side, stress is concentrated on the tip of the crack C1, and a new crack C2 is caused to develop in the inside. The application position of the laser beam LB2 is subjected to scanning or indexing feeding in the direction indicated by an arrow R4 in the figure from the outer circumferential side toward the center side, and the position of the expanded region L1 formed inside the ingot 20 is also moved according to this. Note that the method for scanning or indexing feeding of the laser beam LB2 relative to the ingot 20 can be carried out by the method which has been described based on FIGS. 4A and 4B. Then, with the laser beam LB2 applied from the upper surface 20a of the ingot 20 to the whole region of the ingot 20, the peeling-off layer is formed at the position corresponding to the thickness of the wafer to be formed (peeling-off layer forming step). After the peeling-off layer is formed in this way, the upper surface 20a side of the region where the peeling-off layer is formed is peeled off, as depicted in FIG. 8, whereby the wafer W is formed from the ingot 20 (wafer forming step).

Figure 8:
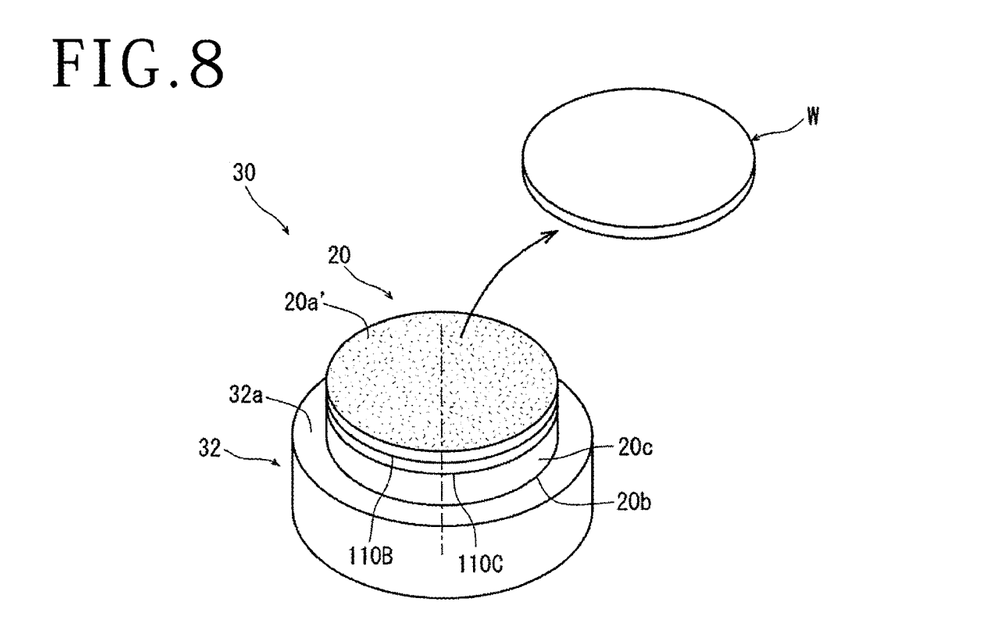
FIG. 8 is a perspective view depicting an embodiment of a wafer forming step to be carried out after the peeling-off layer forming step depicted in FIG. 7 is performed.

As has been described above, after the wafer W is formed from the ingot 20, polishing of the new upper surface 20a' depicted in FIG. 8 to form a mirror surface is conducted, as required. Subsequently, the tip of the expanded region L1 formed by the laser beam LB2 is positioned at the tip position of the crack C1 formed to extend from the cut groove 110B formed at a position corresponding to the wafer to be formed next. Then, the laser beam LB2 is applied from the new upper surface 20a' of the ingot 20 to the whole region of the ingot 20, to form the peeling-off layer similarly to that described above. After the peeling-off layer is formed, the wafer forming step is carried out, to peel off again the wafer W from the ingot 20. By repeating this, the peeling-off layer forming step and the wafer forming step can be successively carried out by the number of the modified layers formed in advance, so that the wafers W can be formed efficiently.

The means for exerting an external force from the upper surface 20a of the ingot 20 in order to perform the peeling-off layer forming step to the ingot 20 having undergone the modified layer forming step may be second external force exerting means described below.

The second external force exerting means is, similarly to the first external force exerting means, is means for applying a laser beam from the upper surface 20a of the ingot 20, specifically, means for applying a pulsed laser beam of such a wavelength as to be absorbed in the ingot 20 to the upper surface 20a of the ingot 20. This will be described more specifically referring to FIG. 9.

Figure 9:
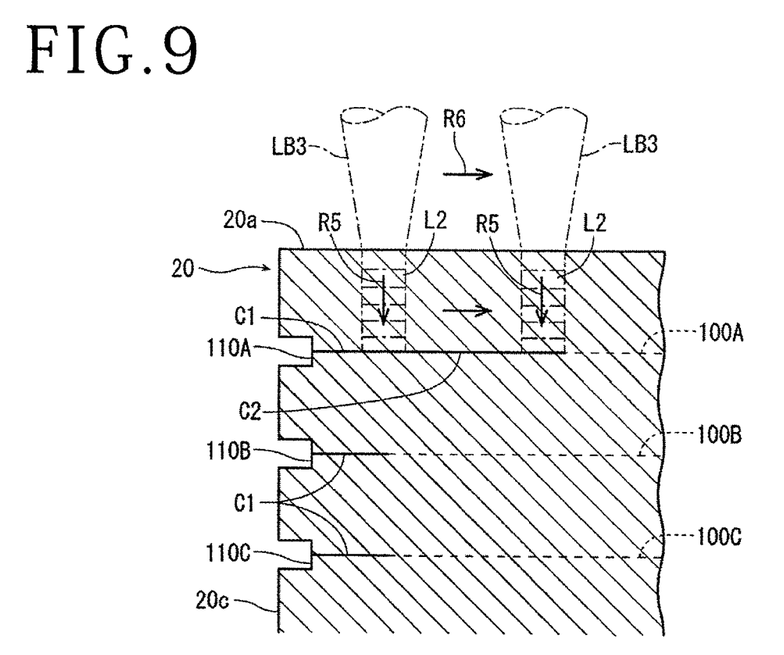
FIG. 9 is a partially enlarged sectional view depicting another embodiment of the peeling-off layer forming step depicted in FIG. 7.

In the modified layer forming step of the present embodiment, also, the modified layers 100A, 100B, and 100C are collectively formed in advance, and further, the modified layers 100A, 100B, and 100C are engraved from the side surface 20c side of the ingot 20 by use of the cutting unit 40 as depicted in FIG. 9, to form the cut grooves 110A, 110B, and 110C. Then, the cracks C1 extending from the respective positions where the modified layers 100A, 100B, and 100C are formed to the inside are caused to develop. Note that the depth positions where the modified layers 100A, 100B, and 100C are formed are indicated by dotted lines.

The laser processing conditions of the laser beam LB3 are, for example, as follows.

Wavelength: 355 nm or 532 nm
Repetition frequency: 100 kHz
Average output: 100 W
Pulse width: 100 ns
Spot diameter: 1 μm
Feeding speed: 100 mm/sec
Indexing feeding: 2 mm At the time of carrying out the peeling-off layer forming step by the second external force exerting means, first, similarly to the first external force exerting means, a beam condenser (omitted from illustration) is positioned on an upper side of the upper surface 20a of the ingot 20. The beam condenser is positioned in the vicinity of the outer circumference of the upper surface 20a of the ingot 20, and a laser beam LB3 is applied to the upper surface 20a. The laser beam LB3 is set at a comparatively strong average output (100 W) as described above, but is set to such a wavelength as to be absorbed in the ingot 20 and is set such that the focal point is at a deep position in the inside of the ingot 20; therefore, it does not damage the upper surface 20a of the ingot 20, and instantaneously heats the upper surface 20a to generate a stress wave L2. The stress wave L2 generated at the upper surface 20a is propagated in the direction indicated by an arrow R5 from the upper surface 20a of the ingot 20. Then, the stress wave L2 reaches the inside of the ingot 20, more specifically, the position corresponding to the thickness of the wafer to be formed and the crack C1 formed in the modified layer forming step, whereby a new crack C2 is caused to develop from the side surface 20c side toward the inside by the stress generated when the stress wave L2 is reflected at the crack C1.

In addition, simultaneously with this, similarly to the above depicted in FIG. 4A, the holding table 32 is rotated, and the beam condenser for applying the laser beam LB3 is moved in the direction indicated by an arrow R6 toward the center of the upper surface 20a of the ingot 20. As a result, the application position of the laser beam LB3 is spirally scanned from the outer circumference of the upper surface 20a of the ingot 20 toward the inside, and at the same time, the application position of the laser beam LB3 is also moved spirally. As a result, the peeling-off layer is formed at the depth position corresponding to the thickness of the wafer to be formed, from the upper surface 20a of the ingot 20 (peeling-off layer forming step). Note that, in the present embodiment, the rotational speed of the holding table 32 and the moving speed of the beam condenser are set such that the feeding speed at the time of applying the laser beam LB3 is 100 mm/sec and the indexing feeding is 2 mm.

After the peeling-off layer is formed as described above, the wafer forming step is carried out similarly to that described above referring to FIG. 8, to form the wafer W from the ingot 20. Then, the new upper surface 20a' formed at the upper surface is subjected to a polishing step, as required, and further, the second external force exerting means is operated similarly to perform again the peeling-off layer forming step and the wafer forming step and form the wafer W.

Further, the present invention is not limited to using the first external force exerting means and the second external force exerting means, and the peeling-off layer forming step may be carried out by use of third external force exerting means described below. The third external force exerting means will be described below referring to FIG. 10.

Figure 10:
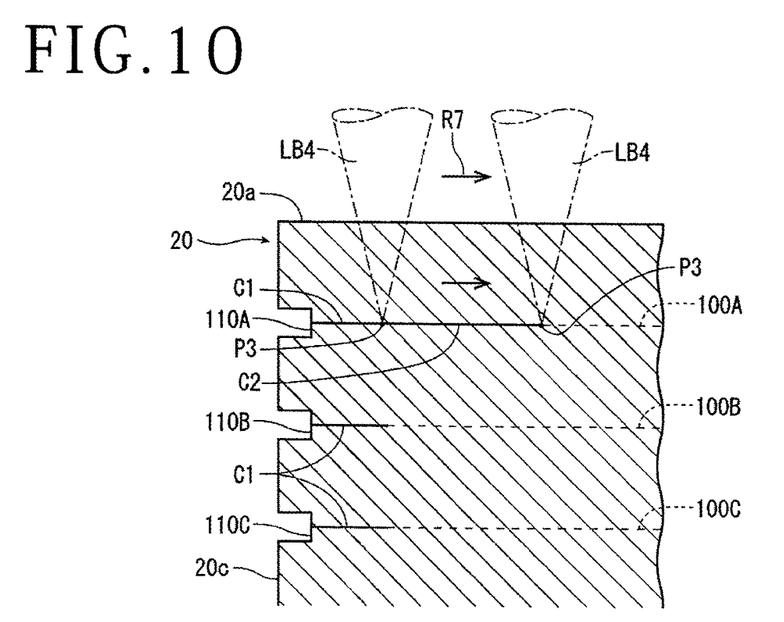
FIG. 10 is a partially enlarged sectional view depicting a further embodiment of the peeling-off layer forming step depicted in FIG. 7.

The third external force exerting means is, similarly to the first external force exerting means and the second external force exerting means, means for applying a laser beam from the upper surface 20a of the ingot 20, specifically, means for applying a pulsed laser beam LB4 of such a wavelength as to be transmitted through the ingot 20 to the upper surface 20a of the ingot 20. In the modified layer forming step of the present embodiment, also, the modified layers 100A, 100B, and 100C are formed collectively in advance, and further, as depicted in FIG. 10, the modified layers 100A, 100B, and 100C are engraved from the side surface 20c side of the ingot 20 by use of the cutting unit 40, to form the cut grooves 110A, 110B, and 110C. Then, cracks C1 extending from the respective positions where the modified layers 100A, 100B, and 100C are formed to the inside are caused to develop. Note that the depth positions where the modified layers 100A, 100B, and 100C are formed are indicated by dotted lines.

The laser processing conditions of the laser beam LB4 are, for example, as follows. Note that the laser beam LB4 is a pulsed laser beam.

Wavelength: 1,064 nm
Repetition frequency: 80 kHz
Average output: 0.5 W
Pulse width: 100 ns
Spot diameter: 0.5 µm
Numerical aperture (NA): 0.45
Feeding speed: 400 mm/sec
Indexing feeding: 1 mm At the time of carrying out the peeling-off layer forming step by the third external force exerting means, first, the beam condenser (omitted from illustration) is positioned on an upper side of the upper surface 20a of the ingot 20, as in the case of the first external force exerting means and the second external force exerting means. Further, the position of a focal point P3 of the laser beam LB4 applied from the beam condenser is set to be inside the ingot 20 and at a position of an inside end portion of the crack C1. Then, the beam condenser is positioned in the vicinity of the outer circumference of the upper surface 20a of the ingot 20, and the laser beam LB4 is applied to the upper surface 20a. The laser beam LB4 is set to have such a wavelength as to be transmitted through the ingot 20 as described above, and a stress caused by nonlinear absorption such as multiphoton absorption is generated at the position where the focal point P3 is formed. In this instance, since the laser beam LB4 is set to have a comparatively weak average output (0.5 W), no modified layer or the like is formed, and the new crack C2 is caused to develop from the side surface 20c side toward the inside by the stress generated by the crack C1.

In addition, simultaneously with this, similarly to that depicted in FIG. 4A, the holding table 32 is rotated, and the beam condenser for applying the laser beam LB4 is moved in the direction indicated by an arrow R7 toward the center of the upper surface 20a of the ingot 20. As a result, the application position of the laser beam LB4 is scanned spirally from the outer circumference of the upper surface 20a of the ingot 20 toward the inside, and at the same time, the application position of the laser beam LB4 is also moved spirally. Consequently, the peeling-off layer is formed at the depth position corresponding to the thickness of the wafer to be formed, from the upper surface 20a of the ingot 20 (peeling-off layer forming step). Note that, in the present embodiment, the rotational speed of the holding table 32 and the moving speed of the beam condenser are set such that the feeding speed at the time of applying the laser beam LB4 is 100 mm/sec and the indexing feeding is 2 mm.

After the peeling-off layer is formed as described above, the wafer forming step is carried out similarly to the above described referring to FIG. 8, to form the wafer W from the ingot 20. Then, the new upper surface 20a' formed at the upper surface is subjected to a polishing step, as required, and, further, similarly, the third external force exerting means is operated to perform again the peeling-off layer forming step and the wafer forming step and form the wafer W.

The first external force exerting means, the second external force exerting means, and the third external force exerting means mentioned above are all means for exerting an external force by applying a laser beam from the upper surface 20a of the ingot 20, but this is not limitative of the present invention, and means for exerting an external force by a method other than the means of applying a laser beam may be adopted. Fourth external force exerting means of applying an ultrasonic wave from the upper surface 20a of the ingot 20, concentrating a stress on the crack C1 extending from the modified layer 100 toward the inside, and causing a new crack C2 to develop from the side surface 20c side toward the inside, to thereby form the peeling-off layer will be described below referring to FIG. 11.

Figure 11:
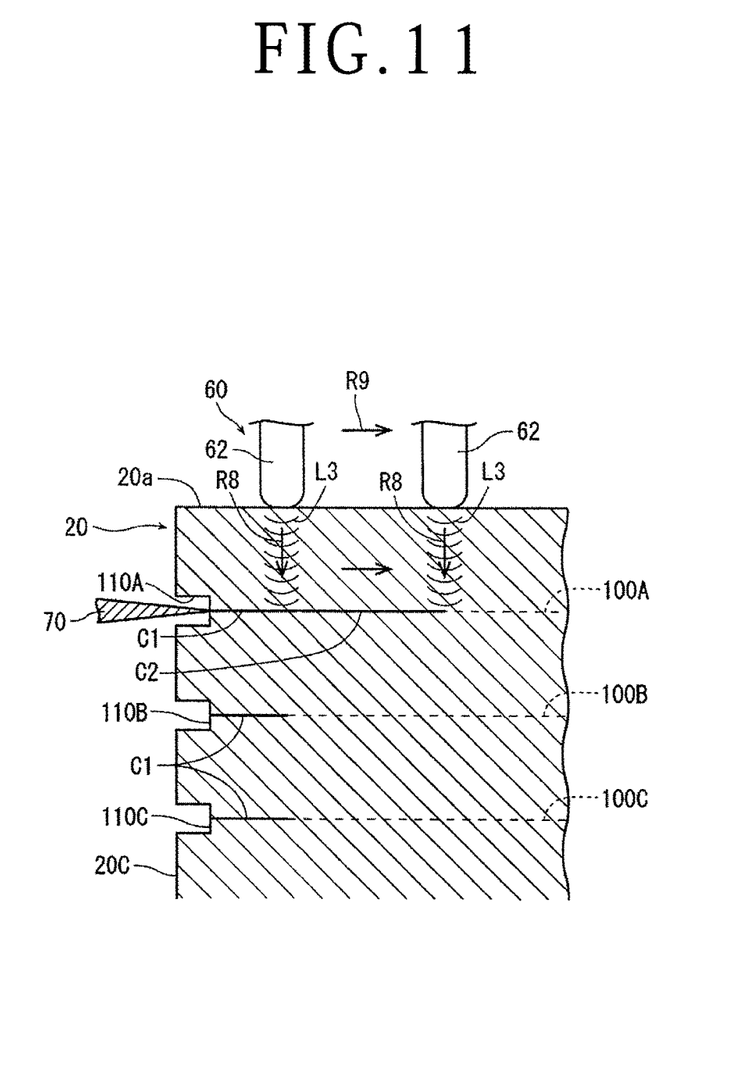
FIG. 11 is a partially enlarged sectional view depicting a mode of carrying out the peeling-off layer forming step by use of ultrasonic wave applying means with respect to the semiconductor ingot.

In the modified layer forming step in the present embodiment, also, the modified layers 100A, 100B, and 100C are formed collectively in advance, and, further, the modified layers 100A, 100B, and 100C are engraved from the side surface 20c side of the ingot 20 by use of the cutting unit 40 as depicted in FIG. 11, to form the cut grooves 110A, 110B, and 110C. Then, the cracks C1 extending from the respective positions where the modified layers 100A, 100B, and 100C are formed to the inside are caused to develop. Note that the depth positions where the modified layers 100A, 100B, and 100C are formed are indicated by dotted lines.

The fourth external force exerting means includes an ultrasonic vibrator 62 having a diameter of 10 mm and functioning as ultrasonic wave applying means of applying an ultrasonic wave from the upper surface 20a side of the ingot 20 to the upper surface 20a. At the time of carrying out the peeling-off layer forming step by the fourth external force exerting means, first, the ultrasonic vibrator 62 is positioned on an upper side of the upper surface 20a of the ingot 20 and in the vicinity of an outer circumference of the upper surface 20a of the ingot 20. Note that the application conditions of the ultrasonic wave applied by the ultrasonic vibrator 62 are set, for example, as follows.

Ultrasonic wave: 24 kHz
Average output: 20 W
Feeding speed: 10 mm/sec
Ultrasonic wave application diameter: 10 mm
Indexing feeding: 10 mm In the present embodiment, the ultrasonic vibrator 62 is positioned at the outer circumference of the upper surface 20a of the ingot 20, and a wedge 70 as depicted in FIG. 11 is positioned in contact with the cut groove 110A formed by engraving the modified layer 100A by positioning the cutting blade 42 of the cutting unit 40 from the side surface 20c of the ingot 20. Next, the ultrasonic vibrator 62 is operated, whereby an ultrasonic wave L3 applied to the upper surface 20a is propagated in the direction indicated by an arrow R8 from the upper surface 20a of the ingot 20. Then, the ultrasonic wave L3 reaches the inside of the ingot 20, more specifically, the position corresponding to the thickness of the wafer to be formed and the crack C1 having been formed in the modified layer forming step, and, by a stress generated when the ultrasonic wave L3 is reflected on the crack C1 and the action of the wedge 70, a new crack C2 is caused to develop from the side surface 20c side toward the inside.

In addition, simultaneously with this, similarly to the above depicted in FIG. 4A, the holding table 32 is rotated, and the ultrasonic vibrator 62 for applying the ultrasonic wave is moved in the direction indicated by an arrow R9 toward the center of the upper surface 20a of the ingot 20. As a result, the position where the ultrasonic wave L3 is applied is moved spirally from the outer circumference of the upper surface 20a of the ingot 20 toward the inside, and at the same time, the position where the ultrasonic wave is applied is also moved spirally. Consequently, the crack C2 is caused to develop to the center of the ingot 20, and the peeling-off layer is formed in the whole region at the depth position corresponding to the thickness of the wafer to be formed (peeling-off layer forming step).

Note that, in the present embodiment, the rotational speed of the holding table 32 and the moving speed of the ultrasonic vibrator 62 are set such that the feeding speed of the position where the ultrasonic wave L3 is to be applied by the ultrasonic vibrator 62 is 10 mm/sec and the indexing feeding is 10 mm. In addition, the method for moving the ultrasonic vibrator 62 is not limited to the abovementioned spiral shape, and, as has been described based on FIG. 4B, a method of moving the ultrasonic vibrator 62 rectilinearly in the X-axis direction while performing indexing feeding may also be adopted.

After the peeling-off layer is formed as described above, the wafer forming step is carried out similarly to that described above referring to FIG. 8, to form the wafer W from the ingot 20. Then, the new upper surface 20a' formed at the upper surface is subjected to a polishing step, as required, and, further, similarly, the fourth external force exerting means is operated to perform again the peeling-off layer forming step and the wafer forming step and form the wafer W.

According to the abovementioned embodiments, the crack C1 formed to extend toward the inside from the modified layer 100 formed from the side of the side surface 20c constituting the outer circumference of the ingot 20 is caused to efficiently develop, thereby forming the peeling-off layer, so that the amount thrown away at the time of forming the wafers W from the ingot 20 can be reduced, and the wafers W can be formed efficiently.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A wafer forming method for forming a wafer from a semiconductor ingot having an upper surface, a lower surface, and a side surface, the wafer forming method comprising:
   a modified layer forming step of applying a first laser beam to the semiconductor ingot, with a focal point of the first laser beam positioned inside from the side surface at a position corresponding to a thickness of a wafer to be formed, to form a modified layer over a whole circumference of the side surface or in an arcuate shape;
   a peeling-off layer forming step of exerting an external force from the upper surface of the semiconductor ingot and concentrating a stress on a crack extending from the modified layer to the inside to cause the crack to develop from the side surface side toward the inside, thereby forming a peeling-off layer, wherein the external force exerted from the upper surface of the semiconductor ingot is a second laser beam which is set at a comparatively weak output compared to an average output of the first laser beam; and
   a wafer forming step of peeling off the wafer to be formed, from the semiconductor ingot, with the peeling-off layer as a start point, to form the wafer.

2. The wafer forming method according to claim 1, wherein the second laser beam is applied spirally from an outer circumference toward the inside or is applied rectilinearly while indexing feeding is performed.

3. The wafer forming method according to claim 2, wherein the second laser beam is of such a wavelength as to be absorbed in the semiconductor ingot and is applied while being positioned inside the wafer to be formed, to thereby partially expand the wafer to be formed and cause the crack to develop from the side surface to the inside.

4. The wafer forming method according to claim 2, wherein the second laser beam is a pulsed laser beam of such a wavelength as to be transmitted through the semiconductor ingot and is applied with a focal point of the laser beam positioned at the crack, to cause the crack to develop from the side surface to the inside by a stress caused by nonlinear absorption.

5. The wafer forming method according to claim 1, further comprising:
   a cut groove forming step of positioning a cutting blade from the side surface of the semiconductor ingot to engrave the modified layer, thereby forming a cut groove, after the modified layer forming step and before the peeling-off layer forming step,
   wherein a crack extending from the modified layer to the inside is grown.

6. The wafer forming method according to claim 1, wherein, in the modified layer forming step, a plurality of modified layers are formed according to the number of a plurality of wafers to be formed.

7. The wafer forming method according to claim 6, wherein, in the modified layer forming step, a peeling-off layer forming step of forming a peeling-off layer extending from the modified layer corresponding to the wafer to be formed next to the inside is performed after the wafer to be formed is peeled off from the upper surface of the semiconductor ingot in the wafer forming step.

8. The wafer forming method according to claim 1, wherein, in the peeling-off layer forming step, a modified layer is not formed by the second laser beam at a position of a focal point of the second laser beam.

* * * * *